United States Patent
Hosoi et al.

(10) Patent No.: US 11,809,997 B2
(45) Date of Patent: Nov. 7, 2023

(54) ACTION RECOGNITION APPARATUS, ACTION RECOGNITION METHOD, AND COMPUTER-READABLE RECORDING MEDIUM

(71) Applicant: NEC Corporation, Tokyo (JP)

(72) Inventors: Toshinori Hosoi, Tokyo (JP); Ryo Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 631 days.

(21) Appl. No.: 17/043,275

(22) PCT Filed: Apr. 13, 2018

(86) PCT No.: PCT/JP2018/015561
§ 371 (c)(1),
(2) Date: Sep. 29, 2020

(87) PCT Pub. No.: WO2019/198233
PCT Pub. Date: Oct. 17, 2019

(65) Prior Publication Data
US 2021/0049351 A1    Feb. 18, 2021

(51) Int. Cl.
*G06N 3/08* (2023.01)
*G06N 3/084* (2023.01)
(Continued)

(52) U.S. Cl.
CPC ........... *G06N 3/084* (2013.01); *G06F 18/217* (2023.01); *G06F 18/28* (2023.01); *G06N 20/00* (2019.01);
(Continued)

(58) Field of Classification Search
CPC ........ G06N 3/084; G06N 20/00; G06N 3/045; G06F 18/217; G06F 18/28; G06V 10/772;
(Continued)

(56) References Cited

U.S. PATENT DOCUMENTS

| | | |
|---|---|---|
| 2018/0012411 A1 | 1/2018 | Richey et al. |
| 2019/0026906 A1 | 1/2019 | Kawai |
| 2019/0311475 A1 | 10/2019 | Hosoi |

FOREIGN PATENT DOCUMENTS

| | | |
|---|---|---|
| JP | H06-274636 A | 9/1994 |
| WO | 2017/154630 A1 | 9/2017 |
| WO | 2018/008593 A1 | 1/2018 |

OTHER PUBLICATIONS

Japanese Office Communication for JP Application No. 2020-513040 dated Oct. 19, 2021 with English Translation.

(Continued)

*Primary Examiner* — Charlotte M Baker
(74) *Attorney, Agent, or Firm* — Sughrue Mion, PLLC (57) ABSTRACT

An action recognition apparatus 1 including: a generation unit 2 that generates an addition image by adding a setting image to a target object image; an action recognition and estimation unit 3 that performs action recognition regarding the target object, outputs action recognition information indicating the result of action recognition, estimates the setting image, and outputs estimation information indicating the result of estimation; an action recognition loss calculation unit 4 that calculates an action recognition loss by using reference action recognition information generated in advance, and the action recognition information; an estimation loss calculation unit 5 that calculates an estimation loss by using reference estimation information generated in advance, and the estimation information; and a learning parameter updating unit 6 that updates learning parameters by using the action recognition loss and the estimation loss.

15 Claims, 6 Drawing Sheets

(51) Int. Cl.
  *G06N 20/00*   (2019.01)
  *G06V 10/20*   (2022.01)
  *G06V 40/10*   (2022.01)
  *G06F 18/28*   (2023.01)
  *G06F 18/21*   (2023.01)
  *G06V 10/772*  (2022.01)
  *G06V 10/776*  (2022.01)
  *G06V 20/52*   (2022.01)

(52) U.S. Cl.
  CPC ............ *G06V 10/20* (2022.01); *G06V 10/772* (2022.01); *G06V 10/776* (2022.01); *G06V 40/10* (2022.01); *G06V 20/52* (2022.01)

(58) Field of Classification Search
  CPC ...... G06V 10/776; G06V 40/10; G06V 40/20; G06V 20/52; G06T 7/00
  USPC .......................................................... 382/103
  See application file for complete search history.

(56) References Cited

OTHER PUBLICATIONS

International Search Report for PCT Application No. PCT/JP2018/015561, dated Jul. 17, 2018.
English translation of Written opinion for PCT Application No. PCT/JP2018/015561, dated Jul. 17, 2018.
Karen Simonyan, Andrew Zisserman, "Two-Stream Convolutional Networks for Action Recognition in Videos" [online], Jun. 9, 2014, Visual Geometry Group, University of Oxford, [searched on Oct. 3, 2005], the Internet <URL: https://papers.nips.cc/paper/5353-two-stream-convolutional-networks-for-action-recognition-in-videos.pdf>.
Yukihide Takagaki and Masaki Aono, "Online Human Action Detection using Deep Spatio-temporal Transformation", IEICE Technical Report, vol. 117, No. 238, The Institute of Electronics, Information and Communication Engineers, Oct. 5, 2017, pp. 31-35, ISSN 0913-5685, Japan.

ADDITION IMAGE

ACTION RECOGNITION APPARATUS, ACTION RECOGNITION METHOD, AND COMPUTER-READABLE RECORDING MEDIUM

This application is a National Stage Entry of PCT/JP2018/015561 filed on Apr. 13, 2018, the contents of all of which are incorporated herein by reference, in their entirety.

TECHNICAL FIELD

The present invention relates to an action recognition apparatus, an action recognition method, and a computer-readable recording medium for recognizing actions of a target object.

BACKGROUND ART

Examples of methods for recognizing actions of a target object include a method for recognizing actions of a target object by using features extracted from a plurality of images captured by an image capturing apparatus.

Also, a technology called "Two-Stream ConvNets (Two-Stream Convolutional Networks for Action Recognition in Videos)", which is a sort of deep learning is disclosed as a method for recognizing actions of a target object. See Non-Patent Document 1. According to this technology, there are a CNN (Convolutional Neural Network) in the spatial direction, which extracts features of an object and the background by using images input thereto, and a CNN in the time-series direction, which extracts features related to actions of the object by using a series of horizontal components and a series of vertical components of an optical flow input thereto. Actions of the target object are accurately recognized by integrating the features extracted by these CNNs.

LIST OF PRIOR ART DOCUMENTS

Non-Patent Document

Non-Patent Document 1: Karen Simonyan, Andrew Zisserman、 "Two-Stream Convolutional Networks for Action Recognition in Videos" [online], Jun. 9, 2014, Visual Geometry Group, University of Oxford, [searched on Oct. 3, 2005], the Internet <URL: https://papers.nips.cc/paper/5353-two-stream-convolutional-networks-for-action-recognition-in-videos.pdf>

SUMMARY OF INVENTION

Technical Problems

However, with Two-Stream ConvNets disclosed in Non-Patent Document 1, actions of a target object cannot be accurately recognized when an image other than a target object image that corresponds to the target object captured in an image overlaps, or is adjacent to, the target object image.

An example object of the present invention is to provide an action recognition apparatus, an action recognition method, and a computer-readable recording medium for improving accuracy in recognition of actions of a target object.

Solution to the Problems

To achieve the above-described object, an action recognition apparatus according to one aspect of the present invention includes:

a generation unit that generates an addition image by adding a preset setting image to a target object image corresponding to a target object;

an action recognition and estimation unit that performs action recognition regarding the target object by using the addition image, outputs action recognition information indicating a result of action recognition, estimates the setting image by using the addition image, and outputs estimation information indicating a result of estimation;

an action recognition loss calculation unit that calculates an action recognition loss by using reference action recognition information generated in advance based on the addition image, and the action recognition information;

an estimation loss calculation unit that calculates an estimation loss by using reference estimation information generated in advance based on the addition image, and the estimation information; and a learning parameter updating unit that updates learning parameters by using the action recognition loss and the estimation loss.

Also, to achieve the above-described object, an action recognition method according to one aspect of the present invention includes:

(A) a step of generating an addition image by adding a preset setting image to a target object image corresponding to a target object;

(B) a step of performing action recognition regarding the target object by using the addition image, outputting action recognition information indicating a result of action recognition, estimating the setting image by using the addition image, and outputting estimation information indicating a result of estimation;

(C) a step of calculating an action recognition loss by using reference action recognition information generated in advance based on the addition image, and the action recognition information;

(D) a step of calculating an estimation loss by using reference estimation information generated in advance based on the addition image, and the estimation information; and (E) a step of updating learning parameters by using the action recognition loss and the estimation loss.

Furthermore, to achieve the above-described object, a program stored in a computer-readable recording medium according to one aspect of the present invention causes a computer to carry out:

(A) a step of generating an addition image by adding a preset setting image to a target object image corresponding to a target object;

(B) a step of performing action recognition regarding the target object by using the addition image, outputting action recognition information indicating a result of action recognition, estimating the setting image by using the addition image, and outputting estimation information indicating a result of estimation;

(C) a step of calculating an action recognition loss by using reference action recognition information generated in advance based on the addition image, and the action recognition information;

(D) a step of calculating an estimation loss by using reference estimation information generated in advance based on the addition image, and the estimation information; and (E) a step of updating learning parameters by using the action recognition loss and the estimation loss.

Advantageous Effects of the Invention

As described above, according to the present invention, it is possible to improve accuracy in recognition of actions of a target object.

EXAMPLE EMBODIMENT

The following describes an action recognition apparatus in an example embodiment of the present invention with reference to FIGS. 1 to 6.

Apparatus Configuration

Figure 1:
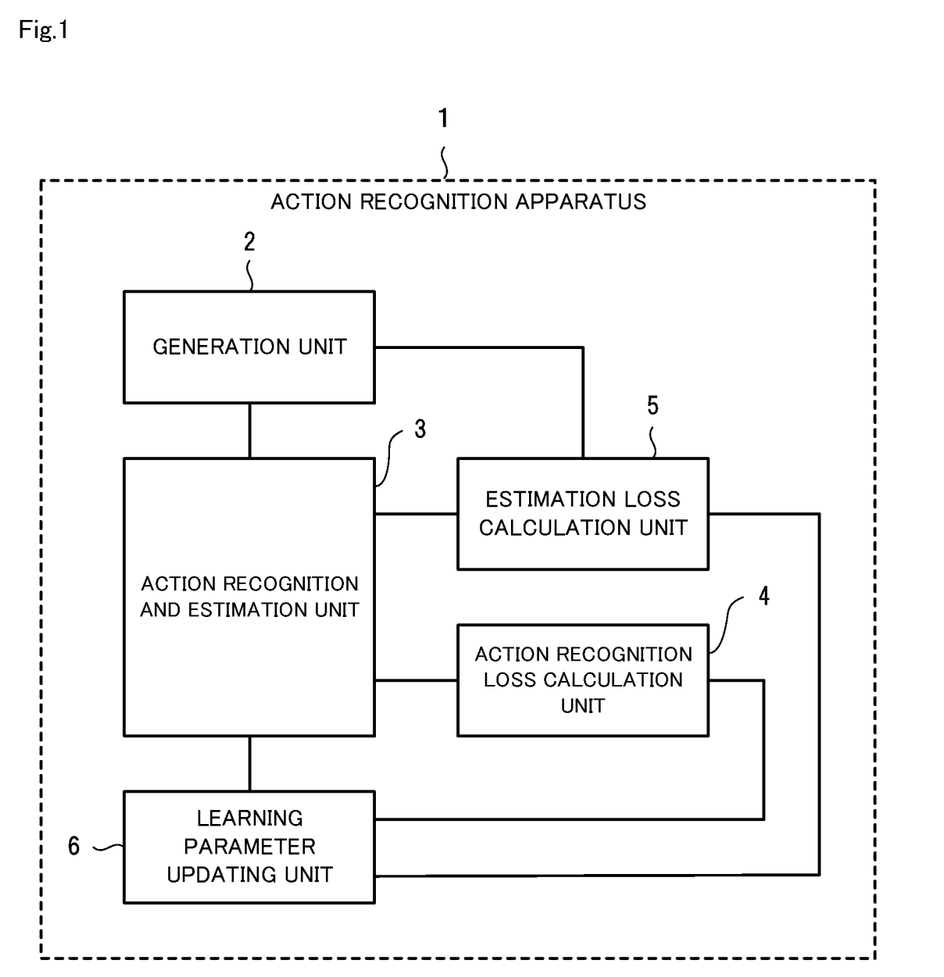
FIG. 1 is a diagram showing an example of an action recognition apparatus in a case where learning is to be performed.

First, a configuration of an action recognition apparatus in the present example embodiment will be described with reference to FIG. 1. FIG. 1 is a diagram showing an example of an action recognition apparatus in a case where learning is to be performed.

As shown in FIG. 1, an action recognition apparatus 1 is an apparatus that accurately recognize actions of a target object. The action recognition apparatus 1 includes a generation unit 2, an action recognition and estimation unit 3, an action recognition loss calculation unit 4, an estimation loss calculation unit 5, and a learning parameter updating unit 6.

Among these units, the generation unit 2 generates an addition image by adding a preset setting image to a target object image corresponding to a target object. A target object is an object that is a target of action recognition, such as a human body, a human body part, a non-human creature, a machine, or the like. A target object image is an image corresponding to a target object in an image (e.g. an image in a video) captured by an image capturing apparatus. A setting image is an image that is set in learning, for example, in order to make it difficult to recognize a target object image from an image in which the target object is captured. In addition, a setting image is an image corresponding to a still life, a building, or the like, in addition to the above-described target object. An addition image is an image only including a target object image or an image including a target object image and setting images. An addition image is an image formed by placing setting images on the front side, the back side, or both front and back sides of the target object image.

Next, the action recognition and estimation unit 3 performs action recognition regarding the target object by using the addition image, outputs action recognition information indicating the result of action recognition, estimates the setting image by using the addition image, and outputs estimation information indicating the result of estimation.

Next, the action recognition loss calculation unit 4 calculates an action recognition loss by using reference action recognition information generated in advance based on the addition image, and the action recognition information. The estimation loss calculation unit 5 also calculates an estimation loss by using reference estimation information generated in advance based on the addition image, and the estimation information. The learning parameter updating unit 6 updates learning parameters by using the action recognition loss and the estimation loss.

As described above, in the present example embodiment, various target object images and setting images are prepared, a large number of addition images in different patterns are generated, and the action recognition apparatus 1 can be trained using a large number of addition images. Therefore, it is possible to improve accuracy in action recognition performed by the action recognition apparatus 1. That is to say, the action recognition apparatus 1 is trained using a large number of addition images generated by utilizing a computer or the like, instead of using actually captured images as in conventional art, and therefore it is possible to improve accuracy in action recognition performed by the action recognition apparatus 1. All of the addition images may be generated using computer graphics. For example, two-dimensional (2D) model or three-dimensional (3D) model may be used to generate addition images.

Note that learning performed by the action recognition apparatus 1 is machine learning or the like. Specifically, deep learning or the like is used. Updating of learning parameters means to update learning parameters for a neural network in deep learning.

Also, in the present example embodiment, when the action recognition apparatus 1 is to be trained, the action recognition apparatus 1 is trained regarding recognition of actions of a target object by using a large number of addition images generated in advance, and is also trained regarding estimation of setting images. That is to say, when the action recognition apparatus 1 is to be trained, the action recognition apparatus 1 performs learning regarding action recognition and learning regarding estimation of setting images at the same time. Furthermore, formulization is performed so that learning can be performed with a focus on action recognition rather than estimation of setting images. As a result, it is possible to establish an action recognition apparatus 1 that can perform accurate action recognition to recognize actions of a target object, after the setting images are removed from the addition images. In other words, the action recognition apparatus 1 can perform learning so as to improve accuracy in action recognition in its entirety even though estimation of setting images is inaccurate.

Specifically, when detecting a suspicious person from a surveillance video that captures a crowd such as in a street, it is possible to detect actions of the suspicious person by removing the images captured on the front side, the back side, or both front and back sides of the target object image corresponding to the suspicious person, from the surveillance video, by using the action recognition apparatus 1 to which the above-described accurate action recognition model has been applied.

Figure 2:
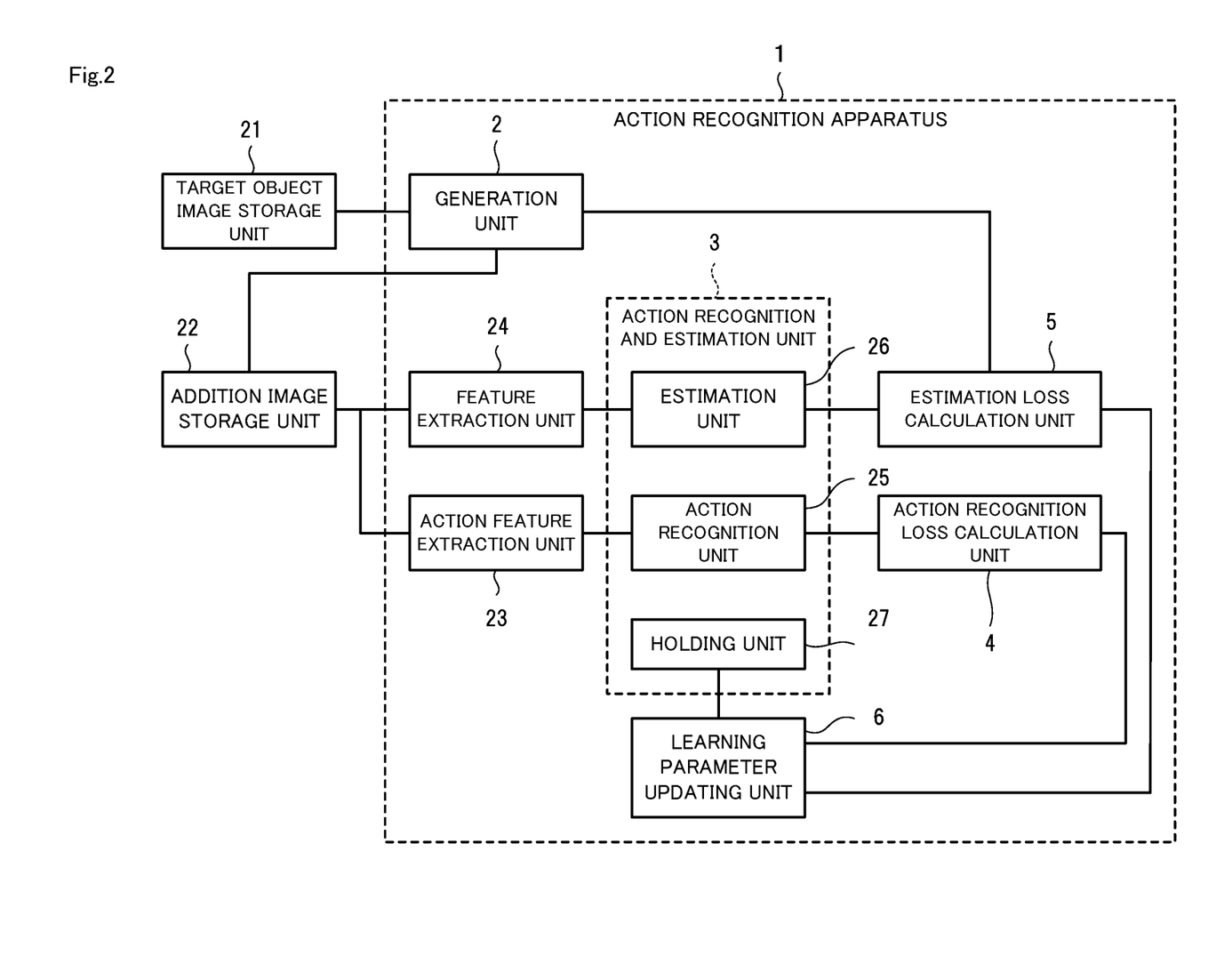
FIG. 2 is a diagram showing an example of an action recognition system that includes the action recognition apparatus in a case where learning is to be performed.
Figure 3:
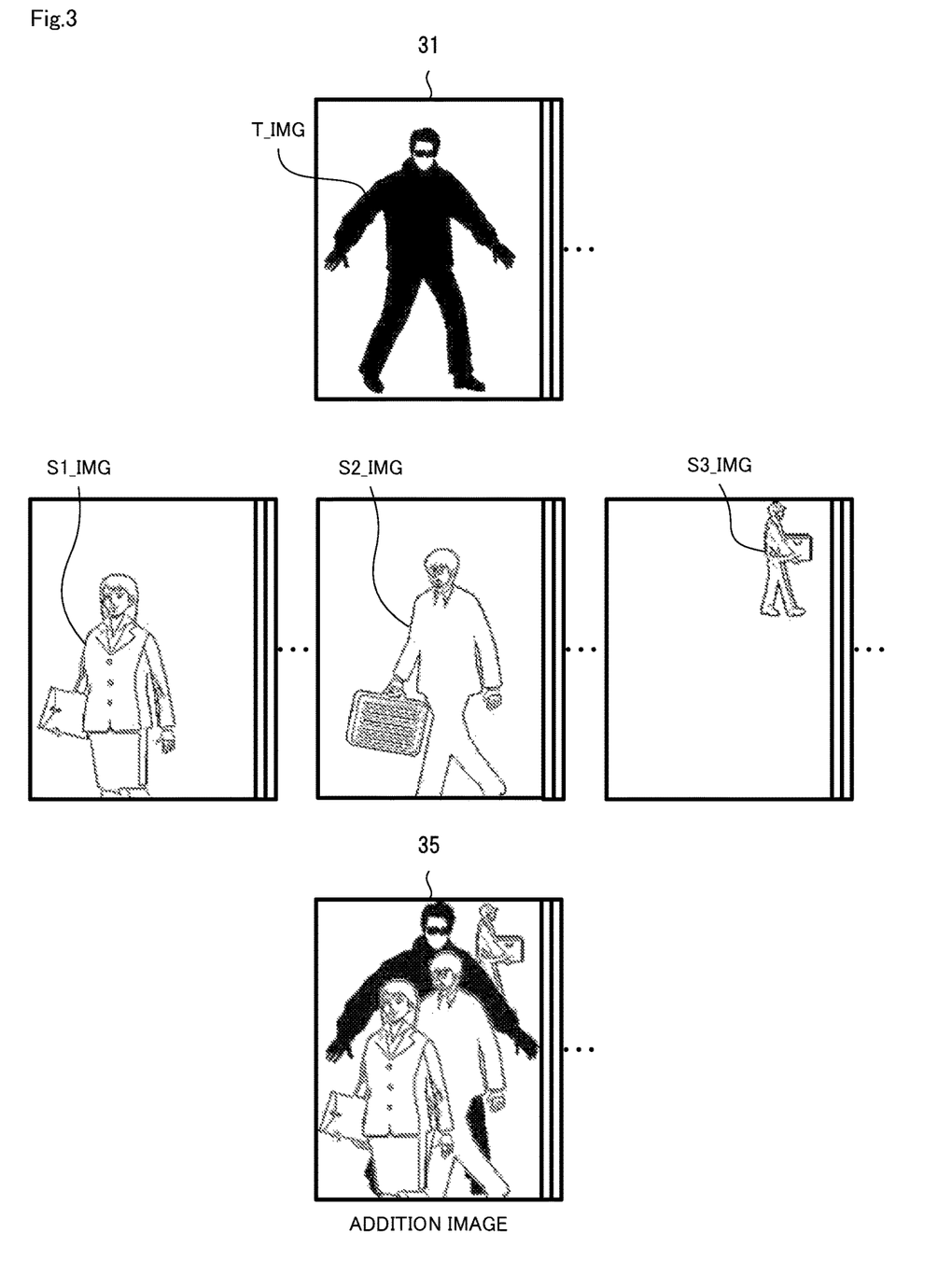
FIG. 3 is a diagram showing examples of a target object image, setting images, and an addition image.

Next, the configuration of the action recognition apparatus 1 in the present example embodiment will be specifically described with reference to FIGS. 2 and 3. FIG. 2 is a diagram showing an example of an action recognition system that includes the action recognition apparatus in a case where learning is performed. FIG. 3 is a diagram showing examples of a target object image, setting images, and an addition image.

As shown in FIG. 2, the action recognition apparatus 1 in the present example embodiment includes a target object image storage unit 21, an addition image storage unit 22, an action feature extraction unit 23, and a feature extraction unit 24 in addition to the generation unit 2, the action recognition and estimation unit 3, the action recognition loss calculation unit 4, the estimation loss calculation unit 5, the learning parameter updating unit 6. The action recognition and estimation unit 3 includes an action recognition unit 25 (a discriminator), an estimation unit 26 (an estimator), and a holding unit 27.

The generation unit 2 acquires an image including a target object image corresponding to a target object, and generates an addition image by adding setting images to the acquired image.

Specifically, the generation unit 2 first acquires an image or a video stored in the target object image storage unit 21 and in which only the target object is captured. A video is constituted by images captured in time series, for example. Next, the generation unit 2 adds setting images to the acquired image that includes the target object image. For example, the generation unit 2 generates an addition image 35 by adding setting images S1_IMG, S2_IMG, and S3_IMG to a target object image T_IMG included in an image 31 shown in FIG. 3, or adding noise to, or filling, a portion of the image 31. Thereafter, the generation unit 2 stores the generated addition image in the addition image storage unit 22. Although the addition image 35 in FIG. 3 is formed by adding all of the setting images S1_IMG, S2_IMG, and S3_IMG, one or two or more images of the setting images S1_IMG, S2_IMG, and S3_IMG may be combined and set.

Also, the target object image or the setting images may be a human body image or an image of an imitation of a human body. Also, the target object image or the setting images may each be an image formed by filling an area within the contour thereof with one or more colors. For example, silhouette images may be used. Also, the setting images may each be an image that is an imitation of a phenomenon that an image becomes white due to the influence of strong sunlight, or a phenomenon that a portion of the image becomes excessively low and becomes black, and hides a portion of the target object image. Furthermore, the setting images are not limited to being images of a physical object, and may be images of an object that transparently covers the target object, such as fog or glass.

The action recognition and estimation unit 3 includes the action recognition unit 25, the estimation unit 26, and the holding unit 27. The action recognition unit 25 performs action recognition regarding the target object based on learning parameters held in the holding unit 27, by using the addition image as an input. While the action recognition unit 25 is performing learning for action recognition, the estimation unit 26 estimates the setting images set to the addition image, based on the learning parameters held in the holding unit 27, by using the addition image as an input.

Specifically, the action recognition unit 25 acquires the addition image from the addition image storage unit 22. Next, the action recognition unit 25 performs action recognition regarding the target object based on the learning parameters held in the holding unit 27, by using the acquired addition image as an input. Thereafter, the action recognition unit 25 outputs action recognition information indicating the result of action recognition.

The action recognition unit 25 outputs, as action recognition information, a label 1 when recognizing the action of walking, a label 2 when recognizing the action of running, a label 3 when recognizing the action of crouching or a crouching state, and a label 4 when recognizing the action of stopping or a stopped state, for example.

Also, as shown in FIG. 2, the action recognition unit 25 may perform action recognition regarding the target object by using information formed by extracting features of the target object image in the addition image, acquired via the action feature extraction unit 23. In such a case, the action recognition unit 25 performs action recognition regarding the target object based on the learning parameters held in the holding unit 27, by using the features of the target object image in the addition image.

Specifically, while the action recognition unit 25 is performing learning regarding action recognition, the estimation unit 26 acquires the addition image from the addition image storage unit 22. Next, the action recognition unit 26 estimates the setting images based on the learning parameters held in the holding unit 27, by using the acquired addition image as an input. Thereafter, the estimation unit 26 outputs estimation information indicating the result of estimation.

The estimation unit 26 may (1) estimate a plurality of joint points from the addition image in which the setting images are human body images, (2) estimate a silhouette image from the addition image in which the set images are silhouette images that are imitations of a human body, (3) estimate a filled image from the addition image in which the setting images are filled images, or (4) estimate the addition image in which the setting images are removed from the target object.

Also, as shown in FIG. 2, the estimation unit 26 may acquire information formed by extracting features of the setting images in the addition image, via the feature extraction unit 24, and estimate the setting image. In such a case, the estimation unit 26 estimate the setting images based on the learning parameters held in the holding unit 27, by using the features of the setting images extracted from the addition image.

Although FIG. 2 shows an example in which the action feature extraction unit 23 and the feature extraction unit 24 are provided at the input stage of the action recognition and estimation unit 3, these units may be omitted and the addition image may be directly input to the action recognition and estimation unit 3. Alternatively, only one of the action feature extraction unit 23 and the feature extraction unit 24 may be used.

Also, although the addition image is stored in the addition image storage unit 22 in FIG. 2, the addition image may be directly output from the generation unit 2 to the action recognition and estimation unit 3 or to the action feature extraction unit 23 and the feature extraction unit 24, without the addition image storage unit 22 being interposed therebetween.

The action recognition loss calculation unit 4 calculates an action recognition loss by using reference action recognition information generated in advance based on the addition image, and the action recognition information acquired from the action recognition unit 25.

Specifically, the action recognition loss calculation unit 4 compares the action recognition information output from the action recognition unit 25 with the reference action recognition information, and sets a smaller value to the action recognition loss as the difference from the reference action recognition information decreases, and sets a larger value to the action recognition loss as the difference increases.

For example, the following describes a case in which, as action recognition information, a label 1 is associated with the action of walking, a label 2 is associated with the action of running, a label 3 is associated with the action of crouching or a crouching state, and a label 4 is associated with the action of stopping or a stopped state. In the above-described case, for example, when the label of reference action recognition information matches the label of the action recognition information, the action recognition loss calculation unit 4 may set 0.0 to the action recognition loss, and in the case of a mismatch, the action recognition loss calculation unit 4 may set 1.0 to the action recognition loss.

Also, if the above-described four labels, namely the labels 1 to 4, are set, four scores are output from the action recognition unit 25. Therefore, these four scores are converted using the SoftMax function. The vector distance between the score {0.1,0.0,0.9,0.1} converted from the four scores and the label {0,0,1,0} of the reference action recognition information may be calculated as a loss.

The estimation loss calculation unit 5 calculates an estimation loss by using the reference estimation information generated by the generation unit 2 in advance based on the addition image, and the estimation information acquired from the estimation unit 26.

Specifically, the estimation loss calculation unit 5 compares the estimation information output from the estimation unit 26 with the reference estimation information generated by the generation unit 2, and sets a smaller value to the estimation loss as the difference from the reference estimation information decreases, and sets a larger value to the estimation loss as the difference increases.

The following describes an estimation loss in the cases where the estimation information shown in the above-described (1) to (4) is used.

(1) The Case in which Joint Points are Used as Estimation Information

In the case where a plurality of joint points of a human body are used to calculate the estimation loss, the estimation loss calculation unit 5 first acquires coordinates corresponding to joint points that are associated with the addition image generated by the generation unit 2, in the generated addition image. Next, the estimation loss calculation unit 5 calculates, for each of the joint points, the distance between the coordinates corresponding to the reference joint point and the coordinates corresponding to the joint point estimated from the addition image indicated by the estimation information output from the estimation unit 26. Thereafter, the estimation loss calculation unit 5 calculates the sum of the distances calculated for the joint points, divides the calculated sum by the size of the human body (the area of the target object image in the addition image), and determines the result of division as the estimation loss.

(2) The Case in which a Silhouette Image is Used as Estimation Information

In the case where a silhouette image is used to calculate the estimation loss, the estimation loss calculation unit 5 first acquires the coordinates and the area of the addition image generated by the generation unit 2, in which a silhouette image that is associated with the generated addition image and that serves as a reference image in the generated addition image is placed (for example, the area is the number of pixels of the silhouette image on the addition image and the like). Next, the estimation loss calculation unit 5 calculates the overlapping area of the reference silhouette image and the silhouette image estimated from the addition image indicated by the estimation information output from the estimation unit 26. Thereafter, the estimation loss calculation unit 5 determines the inverse of the value obtained by dividing the overlapping area by the area of the reference silhouette image, as the estimation loss.

(3) The Case in which a Filled Image is Used as Estimation Information

In the case where a filled image is used to calculate the estimation loss, the estimation loss calculation unit 5 first acquires the coordinates and the area of the addition image generated by the generation unit 2, in which a filled image that is associated with the generated addition image and that serves as a reference image in the generated addition image is placed (for example, the area is the area is the number of pixels of the filled image on the addition image and the like). Next, the estimation loss calculation unit 5 calculates the overlapping area of the reference filled image and the filled image estimated from the addition image indicated by the estimation information output from the estimation unit 26. Thereafter, the estimation loss calculation unit 5 determines the inverse of the value obtained by dividing the overlapping area by the area of the reference filled image, as the estimation loss.

(4) In the Case where an Image Formed by Removing the Setting Images from the Addition Image is Used as Estimation Information In the case where an image formed by removing the setting images is used to calculate the estimation loss, the estimation loss calculation unit 5 first acquires an image formed by removing the setting image associated with the addition image generated by the generation unit 2 and serves as a reference image in the generated addition image. Next, considering the image from which the reference setting image is removed and the image from which the setting image estimated from the addition image indicated by the estimation information output from the estimation unit 26 is removed, as vectors, the estimation loss calculation unit 5 determines the normalized correlation between the vectors or the distance between the vectors as the estimation loss.

The learning parameter updating unit 6 updates the learning parameters held in the holding unit 27 included in the action recognition and estimation unit 3, by using the action recognition loss and the estimation loss. The holding unit 27 may use a storage unit included in the action recognition apparatus 1 or provided outside the action recognition apparatus 1.

Specifically, the learning parameter updating unit 6 acquires the action recognition loss output from the action recognition loss calculation unit 4 and the estimation loss output from the estimation loss calculation unit 5, derives updating parameters using, for example, the backpropagation method used in machine learning, and updates the updating parameters in the holding unit 27.

Figure 4:
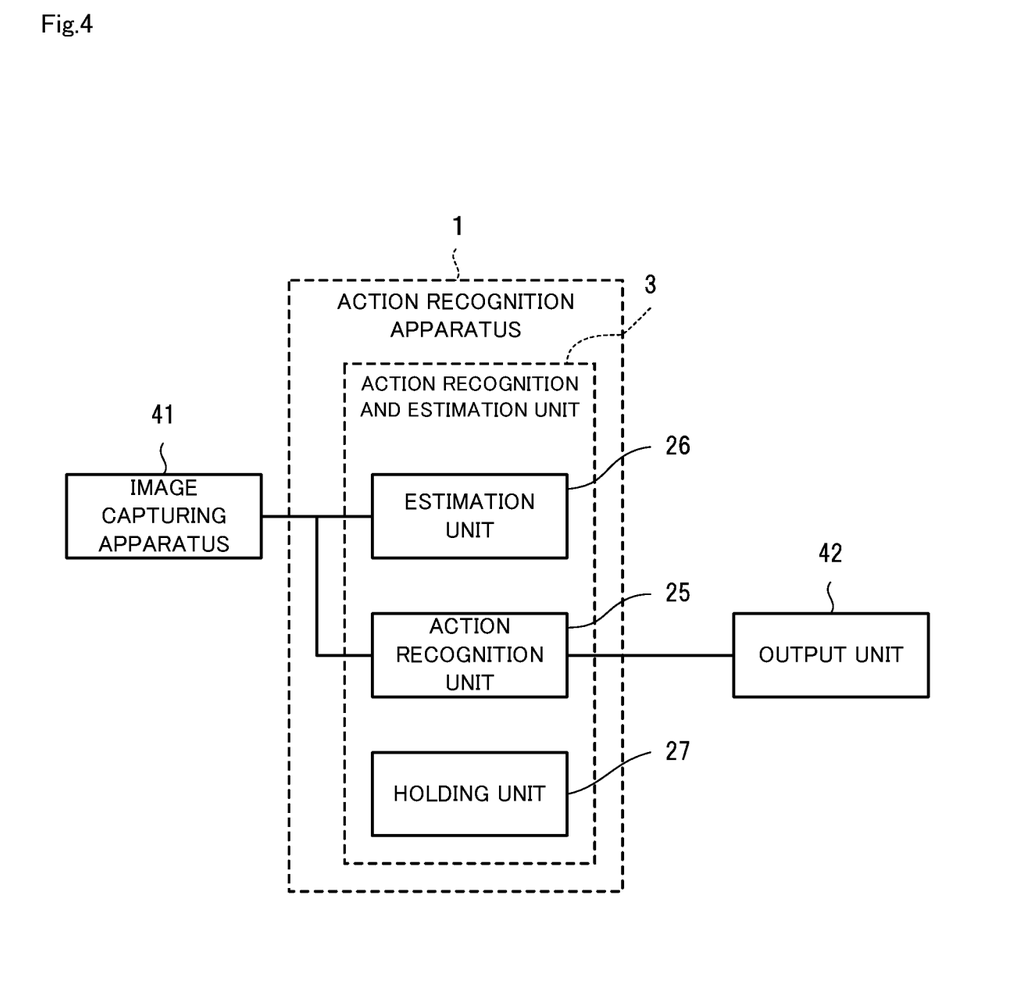
FIG. 4 is a diagram showing examples of the action recognition apparatus after learning and a system that includes the action recognition apparatus.

The following describes action recognition performed by the action recognition apparatus 1 after learning. FIG. 4 is a diagram showing examples of the action recognition apparatus after learning and a system that includes the action recognition apparatus. The system shown in FIG. 4 includes an image capturing apparatus 41, the action recognition apparatus 1, and an output unit 42. Specifically, the system is a system that is applied to an image surveillance system.

The image capturing apparatus 41 is, for example, a video camera, a digital camera, or the like. Specifically, the image capturing apparatus 41 transmits a captured surveillance video to the action recognition apparatus 1 that has performed learning.

The action recognition apparatus 1 actually performs action recognition by using the surveillance video, and outputs action recognition information. When actually performing action recognition, the action recognition apparatus 1 performs action recognition using the action recognition and estimation unit 3 as shown in FIG. 4. At this time, the action recognition unit 25 included in the action recognition and estimation unit 3 outputs action recognition information and the estimation unit 26 also outputs estimation information. However, only the action recognition information needs to be used.

Specifically, in the case of detecting a suspicious person, the action recognition apparatus 1 removes images captured on the front side, the back side, or both front and back sides of the target object image corresponding to the suspicious person, from the surveillance video, to detect the actions of the suspicious person.

For example, when the output unit 42 acquires information formed by converting action recognition information into a format that can be output by the output unit 42, the output unit 42 outputs the result of action recognition indicated by the action recognition information. The output unit 42 is, for example, a display apparatus, an audio output apparatus, or the like.

Apparatus Operations

Figure 5:
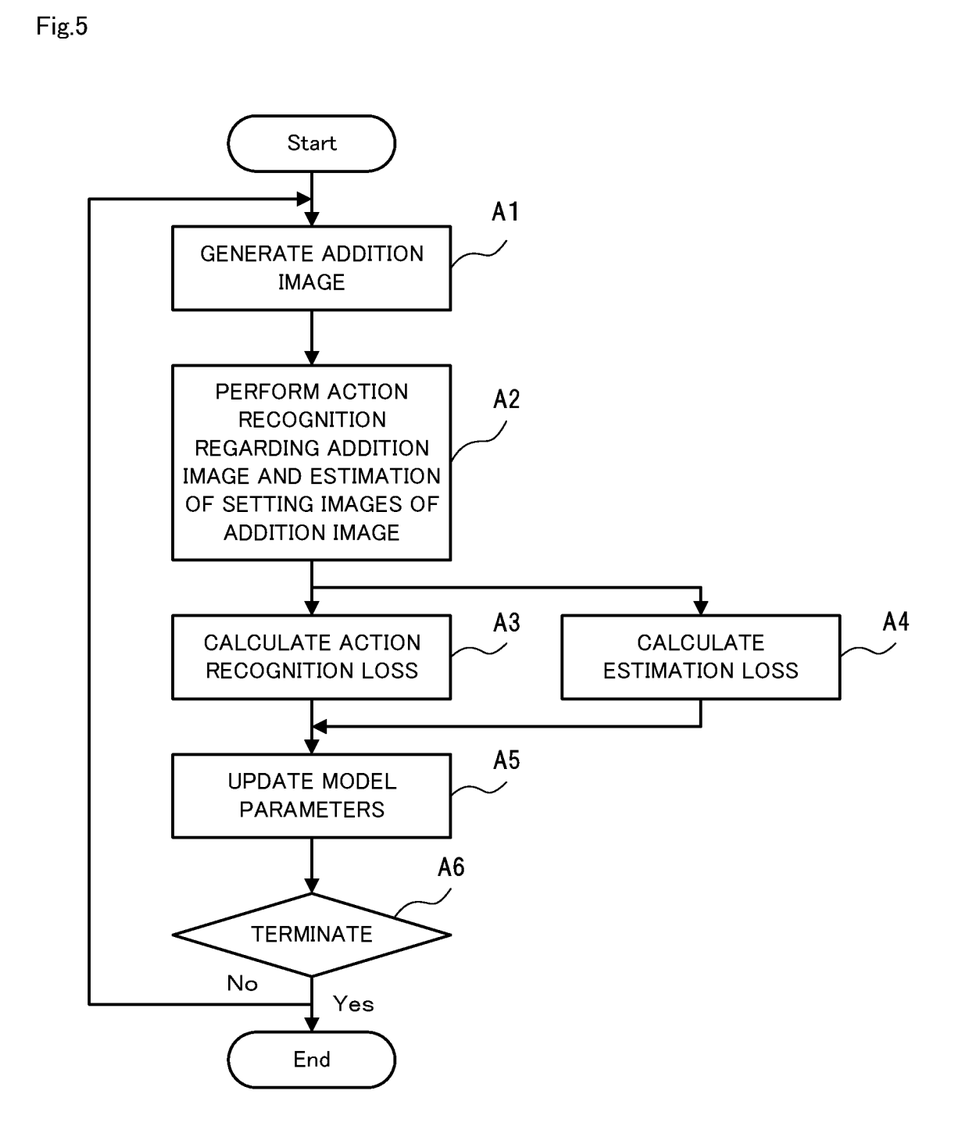
FIG. 5 is a diagram showing examples of operations of the action recognition apparatus in a case where learning is to be performed.

Next, operations of the action recognition apparatus in the example embodiment of the present invention will be described with reference to FIG. 5. FIG. 5 is a diagram showing examples of operations of the action recognition apparatus in a case where learning is to be performed. In the following description, FIGS. 1 to 4 are referenced as necessary. In the present example embodiment, an action recognition method is carried out by operating the action recognition apparatus. Therefore, the following description of operations of the action recognition apparatus substitutes for a description of the action recognition method in the present example embodiment.

As shown in FIG. 5, first, the generation unit 2 generates an addition image by adding a preset setting image to a target object image corresponding to the target object (step A1). Next, the action recognition and estimation unit 3 performs action recognition regarding the target object by using the addition image, outputs action recognition information indicating the result of action recognition, estimates the setting image, and outputs estimation information indicating the result of estimation (step A2). Next, the action recognition loss calculation unit 4 calculates an action recognition loss by using reference action recognition information generated in advance based on the addition image, and the action recognition information (step A3). Also, the estimation loss calculation unit 5 calculates an estimation loss by using reference estimation information generated in advance based on the addition image, and the estimation information (step A4). Learning parameters are updated using the learning parameter updating unit 6 and the action recognition loss and the estimation loss (step A5).

Next, steps A1 to A5 shown in FIG. 5 will be described in detail.

First, before the action recognition apparatus 1 starts learning, initial parameters are set to the holding unit 27. Next, in step A1, the generation unit 2 acquires an image or a video stored in the target object image storage unit 21 and in which only the target object is captured. Next, the generation unit 2 adds setting images to the acquired image that includes the target object image. The generation unit 2 generates the addition image 35 by adding the setting images S1_IMG, S2_IMG, and S3_IMG to the target object image T_IMG included in the image 31 shown in FIG. 3, for example. Thereafter, the generation unit 2 stores the generated addition image in the addition image storage unit 22.

In step A2, the action recognition and estimation unit 3 acquires the addition image. Next, the action recognition and estimation unit 3 performs action recognition regarding the target object based on the learning parameters held in the holding unit 27, by using the acquired addition image as an input. Thereafter, the action recognition and estimation unit 3 outputs action recognition information indicating the result of action recognition.

Also, while performing learning regarding action recognition, the action recognition unit and estimation 3 acquires the addition image. Next, the action recognition unit 26 estimates the setting images based on the learning parameters held in the holding unit 27, by using the acquired addition image as an input. Thereafter, the estimation unit 26 outputs estimation information indicating the result of estimation.

Preferably, the action recognition and estimation unit 3 learns action recognition information and estimation information regarding the setting images by using the same addition image.

In step A3, the action recognition loss calculation unit 4 calculates an action recognition loss relative to the reference action recognition information by using the action recognition information output from the action recognition unit 25 and the reference action recognition information generated by the generation unit 2 in advance.

In step A4, the estimation loss calculation unit 5 calculates an estimation loss relative to the reference estimation information by using the estimation information output from the estimation unit 26 and the reference estimation information generated by the generation unit 2.

In step A5, the learning parameter updating unit 6 acquires the action recognition loss output from the action recognition loss calculation unit 4 and the estimation loss output from the estimation loss calculation unit 5, derives updating parameters using, for example, the backpropagation method used in machine learning, and updates the updating parameters in the holding unit 27.

In step A6, the action recognition apparatus 1 determines whether or not to terminate learning. For example, when the processing indicated by steps A1 to A5 has been performed on all of the target object images or predetermined target object images stored in the target object image storage unit 21 (step A6: Yes), the action recognition apparatus 1 terminates learning. If there is a target object image stored in the target object image storage unit 21 (step A6: No), the action recognition apparatus 1 performs the processing in step A1 again.

Note that, in step A1, the generation unit 2 generates an addition image while increasing the size of the portion that overlaps a target object image, of a setting image, as updating progresses. In step A2, the action recognition and estimation unit 3 updates the updating parameters based on the results of action recognition and setting image estimation by using these addition images.

Specifically, addition images are generated such that the ratio between the area where the setting image overlaps the target object image and the area of the target object image is small. Thereafter, the ratio is gradually increased while the processing in steps A1 to A6 is iterated. For example, in the first iteration, an addition image is generated with the ratio being set to 10%, and in the tenth iteration, the ratio is set to 20%. In the $100^{th}$ iteration, the ratio is set to 40%.

In this way, in the initial stage, an additional image in which the overlap between the target object image and the setting image is minimized is used, and the area of the overlap in the additional image to be used is gradually increased. Thus, it is possible to establish an accurate learning model. When the action recognition apparatus 1 performs learning, if an addition image from which setting images cannot be easily estimated is used in the initial stage, learning accuracy regarding action recognition decreases. Therefore, it is preferable that an addition image from which setting images cannot be easily estimated is used in the initial stage.

If the estimation loss is large, the learning parameters are updated without using an addition image with a large estimation loss. Specifically, learning is performed again after excluding addition images with a large estimation loss. Also, in step A4, if the estimation loss calculation unit 5 determines that the loss is large, the estimation loss calculation unit 5 instructs the learning parameter updating unit 6 not to update the parameters in the holding unit 27.

This is because, when the action recognition apparatus 1 performs learning, if an addition image from which setting images cannot be easily estimated is used, learning accuracy regarding action recognition decreases. Therefore, it is preferable that an addition image from which setting images cannot be easily estimated is used. This is particularly effective when applied to the initial stage.

Effects of Embodiment

As described above, according to the present example embodiment, various target object images and setting images are prepared, a large number of addition images in different patterns are prepared, and the action recognition apparatus 1 can be trained using a large number of addition images. Therefore, it is possible to improve accuracy in action recognition performed by the action recognition apparatus 1. That is to say, the action recognition apparatus 1 is trained using a large number of addition images generated by utilizing a computer or the like, instead of using actually captured images as in conventional art, and therefore it is possible to improve accuracy in action recognition performed by the action recognition apparatus 1.

Also, in the present example embodiment, when the action recognition apparatus 1 is to be trained, the action recognition apparatus 1 is trained regarding recognition of actions of a target object by using a large number of addition images generated in advance, and is also trained regarding estimation of setting images. That is to say, when the action recognition apparatus 1 is to be trained, the action recognition apparatus 1 performs learning regarding action recognition and learning regarding estimation of setting images at the same time. Furthermore, formulization is performed so that learning can be performed with a focus on action recognition rather than estimation of setting images. As a result, it is possible to establish an action recognition apparatus 1 that can perform accurate action recognition to recognize actions of a target object, after the setting images are removed from the addition images. In other words, the action recognition apparatus 1 can perform learning so as to improve accuracy in action recognition in its entirety even though estimation of setting images is inaccurate.

Program

A program in the example embodiment of the present invention need only be a program that causes a computer to carry out the steps A1 to A5 shown in FIG. 5. By installing this program to a computer and executing the program, it is possible to realizes the action recognition apparatus and the action recognition method in the present example embodiment. In this case, a processor of the computer functions as the generation unit 2, the action recognition and estimation unit 3, the action recognition loss calculation unit 4, the estimation loss calculation unit 5, and the learning parameter updating unit 6, and performs processing.

Also, the program in the present example embodiment may be executed by a computer system that is constituted by a plurality of computers. In this case, for example, each computer may function as any of the generation unit 2, the action recognition and estimation unit 3, the action recognition loss calculation unit 4, the estimation loss calculation unit 5, and the learning parameter updating unit 6.

Physical Configuration

Figure 6:
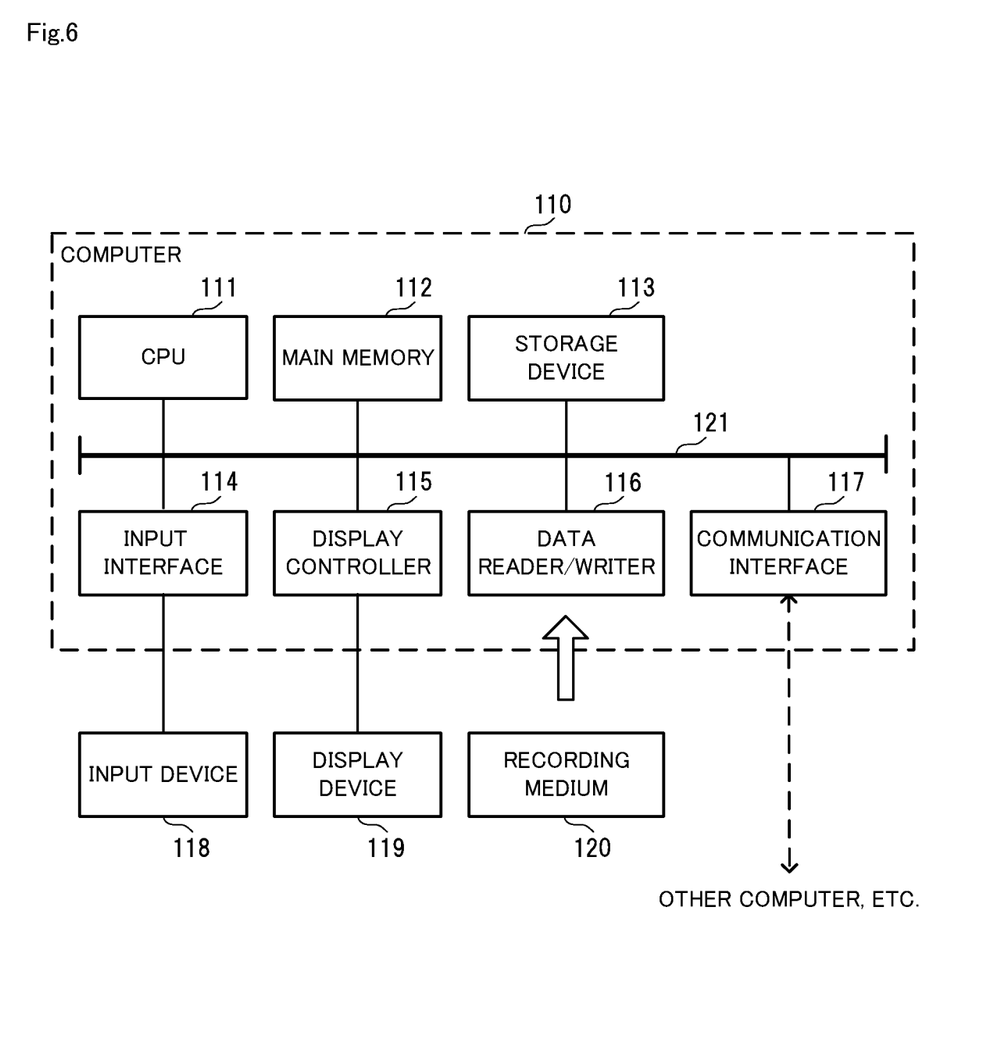
FIG. 6 is a diagram showing an example of a computer that realizes the action recognition apparatus is realized.

Here, a computer that realizes an action recognition apparatus by executing the program in the example embodiment will be described with reference to FIG. 6. FIG. 6 is a block diagram showing an example of a computer that realizes the action recognition apparatus in the example embodiment of the present invention.

As shown in FIG. 6, a computer 110 includes a CPU 111, a main memory 112, a storage device 113, an input interface 114, a display controller 115, a data reader/writer 116, and a communication interface 117. These units are connected so as to be able to communicate with each other via a bus 121. Note that the computer 110 may include a GPU (Graphics Processing Unit) or an FPGA (Field-Programmable Gate Array), in addition to the CPU 111 or instead of the CPU 111.

The CPU 111 performs various computational operations by loading the program (codes) in the present example embodiment that are stored in the storage device 113 to the main memory 112, and executing these codes in predetermined order. The main memory 112 typically is a volatile storage device such as a DRAM (Dynamic Random Access Memory). The program in the present example embodiment is provided in a state of being stored in a computer-readable recording medium 120. Note that the program in the present example embodiment may be distributed over the Internet connected via the communication interface 117.

Specific examples of the storage device 113 include a semiconductor storage device such as a flash memory, in addition to a hard disk drive. The input interface 114 mediates data transmission between the CPU 111 and an input device 118 such as a keyboard or a mouse. The display controller 115 is connected to a display device 119 and controls display on the display device 119.

The data reader/writer 116 mediates data transmission between the CPU 111 and the recording medium 120, and reads out a program from the recording medium 120 and writes processing results of the computer 110 to the recording medium 120. The communication interface 117 mediates data transmission between the CPU 111 and other computers.

Specific examples of the recording medium 120 include a general-purpose semiconductor storage devices such as a CF (Compact Flash (registered trademark)) card and an SD (Secure Digital) card, a magnetic recording medium such as a flexible disk, and an optical recording medium such as a CD-ROM (Compact Disk Read Only Memory).

Supplementary Notes

The following supplementary notes are further disclosed in relation to the above example embodiment. Although the example embodiment described above can be partially or wholly expressed by supplementary notes 1 to 15 described below, the present invention is not limited to the following description.

Supplementary Note 1

An action recognition apparatus including:
- a generation unit that generates an addition image by adding a preset setting image to a target object image corresponding to a target object;
- an action recognition and estimation unit that performs action recognition regarding the target object by using the addition image, outputs action recognition information indicating a result of action recognition, estimates the setting image by using the addition image, and outputs estimation information indicating a result of estimation;
- an action recognition loss calculation unit that calculates an action recognition loss by using reference action recognition information generated in advance based on the addition image, and the action recognition information;
- an estimation loss calculation unit that calculates an estimation loss by using reference estimation information generated in advance based on the addition image, and the estimation information; and
- a learning parameter updating unit that updates learning parameters by using the action recognition loss and the estimation loss.

Supplementary Note 2

The action recognition apparatus according to Supplementary Note 1,
wherein the generation unit uses a human body image or an image of an imitation of a human body as the target object image or the setting image to generate the addition image.

Supplementary Note 3

The action recognition apparatus according to Supplementary Note 1 or 2,
wherein the generation unit uses an image formed by filling an area within a contour thereof with one or more colors as the target object image or the setting image to generate the addition image.

Supplementary Note 4

The action recognition apparatus according to any one of Supplementary Notes 1 to 3,
wherein the learning parameters are updated using the addition image in which the size of a portion that overlaps the target object image, of the setting image, is increased as updating progresses.

Supplementary Note 5

The action recognition apparatus according to any one of Supplementary Notes 1 to 4,
wherein, when the estimation loss is large, the learning parameters are updated without using the addition image with the large estimation loss.

Supplementary Note 6

An action recognition method including:
(A) a step of generating an addition image by adding a preset setting image to a target object image corresponding to a target object;
(B) a step of performing action recognition regarding the target object by using the addition image, outputting action recognition information indicating a result of action recognition, estimating the setting image by using the addition image, and outputting estimation information indicating a result of estimation;
(C) a step of calculating an action recognition loss by using reference action recognition information generated in advance based on the addition image, and the action recognition information;
(D) a step of calculating an estimation loss by using reference estimation information generated in advance based on the addition image, and the estimation information; and
(E) a step of updating learning parameters by using the action recognition loss and the estimation loss.

Supplementary Note 7

The action recognition method according to Supplementary Note 6,
wherein, in the (A) step, a human body image or an image of an imitation of a human body is used as the target object image or the setting image to generate the addition image.

Supplementary Note 8

The action recognition method according to Supplementary Note 6 or 7,
wherein, in the (A) step, an image formed by filling an area within a contour thereof with one or more colors is used as the target object image or the setting image to generate the addition image.

Supplementary Note 9

The action recognition method according to any one of Supplementary Notes 6 to 8,
wherein the learning parameters are updated using the addition image in which the size of a portion that overlaps the target object image, of the setting image, is increased as updating progresses.

Supplementary Note 10

The action recognition method according to any one of Supplementary Notes 6 to 9,
wherein, when the estimation loss is large, the learning parameters are updated without using the addition image with the large estimation loss.

Supplementary Note 11

A computer-readable recording medium on which an action recognition program is recorded, the action recognition program comprising instructions that cause a computer to carry out:
(A) a step of generating an addition image by adding a preset setting image to a target object image corresponding to a target object;
(B) a step of performing action recognition regarding the target object by using the addition image, outputting action recognition information indicating a result of action recognition, estimating the setting image by using the addition image, and outputting estimation information indicating a result of estimation;
(C) a step of calculating an action recognition loss by using reference action recognition information generated in advance based on the addition image, and the action recognition information;
(D) a step of calculating an estimation loss by using reference estimation information generated in advance based on the addition image, and the estimation information; and
(E) a step of updating learning parameters by using the action recognition loss and the estimation loss.

Supplementary Note 12

The computer-readable recording medium according to Supplementary Note 11,
wherein, in the (A) step, a human body image or an image of an imitation of a human body is used as the target object image or the setting image to generate the addition image.

Supplementary Note 13

The computer-readable recording medium according to Supplementary Note 11 or 12, wherein, in the (A) step, an image formed by filling an area within a contour thereof with one or more colors is used as the target object image or the setting image to generate the addition image.

Supplementary Note 14

The computer-readable recording medium according to any one of Supplementary Notes 11 to 13,
wherein the learning parameters are updated using the addition image in which the size of a portion that overlaps the target object image, of the setting image, is increased as updating progresses.

Supplementary Note 15

The computer-readable recording medium according to any one of Supplementary Notes 11 to 14,
wherein, when the estimation loss is large, the learning parameters are updated without using the addition image with the large estimation loss.

While the present invention has been described with reference to the example embodiment, the present invention is not limited to the example embodiment described above. Various modifications that can be understood by a person skilled in the art may be applied to the configuration and the details of the present invention within the scope of the present invention.

INDUSTRIAL APPLICABILITY

As described above, according to the present invention, it is possible to improve accuracy in recognition of actions of a target object. The present invention is useful in the field where it is necessary to improve accuracy in recognition of actions of a target object.

LIST OF REFERENCE SIGNS

1: Action Recognition Apparatus
2: Generation Unit
3: Action Recognition and Estimation Unit
4: Action Recognition Loss Calculation Unit
5: Estimation Loss Calculation Unit
6: Learning Parameter Updating Unit
21: Target Object Image Storage Unit
22: Addition Image Storage Unit
23: Action Feature Extraction Unit
24: Feature Extraction Unit
25: Action Recognition Unit
26: Estimation Unit
27: Holding Unit
110: Computer
111: CPU
112: Main Memory
113: Storage Device
114: Input Interface
115: Display Controller
116: Data Reader/Writer
117: Communication Interface
118: Input Device
119: Display Device
120: Recording Medium
121: Bus

What is claimed is:

1. An action recognition apparatus comprising:
a generation unit that generates an addition image by adding a preset setting image to a target object image corresponding to a target object;
an action recognition and estimation unit that performs action recognition regarding the target object by using the addition image, outputs action recognition information indicating a result of action recognition, estimates the setting image by using the addition image, and outputs estimation information indicating a result of estimation;
an action recognition loss calculation unit that calculates an action recognition loss by using reference action recognition information generated in advance based on the addition image, and the action recognition information;
an estimation loss calculation unit that calculates an estimation loss by using reference estimation information generated in advance based on the addition image, and the estimation information; and
a learning parameter updating unit that updates learning parameters by using the action recognition loss and the estimation loss.

2. The action recognition apparatus according to claim 1, wherein the generation unit uses a human body image or an image of an imitation of a human body as the target object image or the setting image to generate the addition image.

3. The action recognition apparatus according to claim 1, wherein the generation unit uses an image formed by filling an area within a contour thereof with one or more colors as the target object image or the setting image to generate the addition image.

4. The action recognition apparatus according to claim 1, wherein the learning parameters are updated using the addition image in which the size of a portion that overlaps the target object image, of the setting image is increased as updating progresses.

5. The action recognition apparatus according to claim 1, wherein, when the estimation loss is large, the learning parameters are updated without using the addition image with the large estimation loss.

6. An action recognition method comprising:
generating an addition image by adding a preset setting image to a target object image corresponding to a target object;
performing action recognition regarding the target object by using the addition image, outputting action recognition information indicating a result of action recognition, estimating the setting image by using the addition image, and outputting estimation information indicating a result of estimation;
calculating an action recognition loss by using reference action recognition information generated in advance based on the addition image, and the action recognition information;
calculating an estimation loss by using reference estimation information generated in advance based on the addition image, and the estimation information; and
updating learning parameters by using the action recognition loss and the estimation loss.

7. The action recognition method according to claim 6, wherein a human body image or an image of an imitation of a human body is used as the target object image or the setting image to generate the addition image.

8. The action recognition method according to claim 6, wherein an image formed by filling an area within a contour thereof with one or more colors is used as the target object image or the setting image to generate the addition image.

9. The action recognition method according to claim 6, wherein the learning parameters are updated using the addition image in which the size of a portion that overlaps the target object image, of the setting image, is increased as updating progresses.

10. The action recognition method according to claim 6, wherein, when the estimation loss is large, the learning parameters are updated without using the addition image with the large estimation loss.

11. A non-transitory computer-readable recording medium on which an action recognition program is recorded, the action recognition program comprising instructions that cause a computer to carry out:

generating an addition image by adding a preset setting image to a target object image corresponding to a target object;

performing action recognition regarding the target object by using the addition image, outputting action recognition information indicating a result of action recognition, estimating the setting image by using the addition image, and outputting estimation information indicating a result of estimation;

calculating an action recognition loss by using reference action recognition information generated in advance based on the addition image, and the action recognition information;

calculating an estimation loss by using reference estimation information generated in advance based on the addition image, and the estimation information; and updating learning parameters by using the action recognition loss and the estimation loss.

12. The non-transitory computer-readable recording medium according to claim 11,
wherein a human body image or an image of an imitation of a human body is used as the target object image or the setting image to generate the addition image.

13. The non-transitory computer-readable recording medium according to claim 11,
wherein an image formed by filling an area within a contour thereof with one or more colors is used as the target object image or the setting image to generate the addition image.

14. The non-transitory computer-readable recording medium according to claim 11,
wherein the learning parameters are updated using the addition image in which the size of a portion that overlaps the target object image, of the setting image, is increased as updating progresses.

15. The non-transitory computer-readable recording medium according to claim 11,
wherein, when the estimation loss is large, the learning parameters are updated without using the addition image with the large estimation loss.

* * * * *